No. 735,026. PATENTED JULY 28, 1903.
C. A. WILLMARTH & J. S. BARNES.
FENCE WIRE RATCHET OR TIGHTENER.
APPLICATION FILED SEPT. 13, 1902.
NO MODEL.
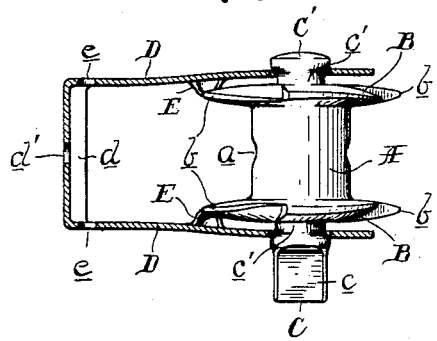
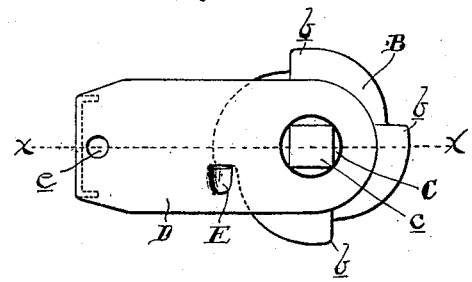
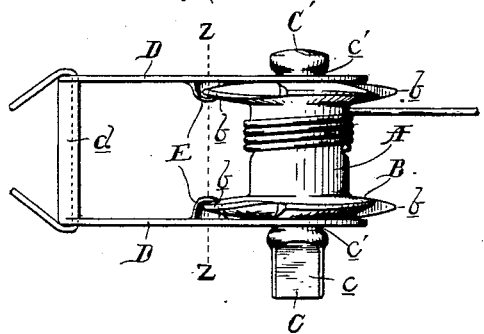
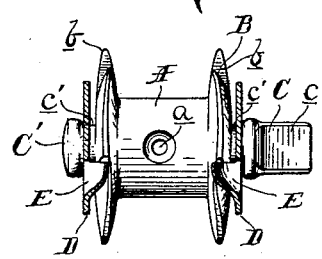
WITNESSES.
Lewis E. Flanders
Thomas L. Longstaff
INVENTORS
Charles A. Willmarth
John S. Barnes
By
Attorneys.

No. 735,026. Patented July 28, 1903.

UNITED STATES PATENT OFFICE.

CHARLES A. WILLMARTH AND JOHN S. BARNES, OF DETROIT, MICHIGAN, ASSIGNORS OF ONE-THIRD TO HARRY J. FERRELL, OF DETROIT, MICHIGAN.

FENCE-WIRE RATCHET OR TIGHTENER.

SPECIFICATION forming part of Letters Patent No. 735,026, dated July 28, 1903.

Application filed September 13, 1902. Serial No. 123,217. (No model.)

*To all whom it may concern:*

Be it known that we, CHARLES A. WILLMARTH and JOHN S. BARNES, citizens of the United States of America, residing at Detroit, in the county of Wayne and State of Michigan, have invented certain new and useful Improvements in Wire-Fence Ratchets or Tighteners, of which the following is a specification, reference being had therein to the accompanying drawings.

Our invention relates to that class of wire-tighteners in which the wire is wound upon a spool journaled in a frame and provided with suitable means to make a ratchet-and-pawl engagement to hold it in any desired position against the tension of the wire.

The object of our invention is to make a cheap, simple, and efficient device for the purpose, which shall be composed of few parts, and to this end the invention consists of a spring-frame adapted to coöperate with the spool to form a ratchet-and-pawl engagement, all as more fully hereinafter described, and shown in the accompanying drawings, in which—

Figure 1 is a plan view of our device as in use; Fig. 2, a side elevation thereof; Fig. 3, a section on the line $xx$, Fig. 2, the spool being shown in elevation; and Fig. 4 a section on the line $zz$, Fig. 1.

A is the spool, provided with a transverse opening $a$ through its axis, and end flanges B B, formed with like ratchet-teeth $b$ upon their periphery, and trunnions C C' at the opposite ends of the spool, the trunnion C being extended and formed with a squared end $c$ to form a wrench-hold to turn the spool in tightening the line-wires of a fence. Both of the trunnions C C' are formed with a gradually-reduced portion $c'$ at their junction with the flanges of the spool for the purpose more fully hereinafter described.

D is a U-shaped spring-frame formed with openings at its ends in which the trunnions C C' are journaled, the frame being preferably struck up from sheet metal and sprung over the trunnions so that there are no parts to get lost, the edges of the frame at its base being bent over to form transverse strengthening-ribs $d$.

$d'$ is an opening in the base of the frame in line with the opening $a$ in the spool, so that the ratchet can be strung right upon a line-wire, thus not necessitating the cutting of the wire, and $e$ are openings formed near the base of the frame, through which one end of the wire may be passed should it be desired to unite the ends of a broken wire, as shown in Fig. 1.

E E are inclined lugs or projections struck up from the frame itself in proximity to the ratchet-teeth on the spool, so that as the spool revolves the inclined side of the lug will travel in contact with the inclined side of the ratchet-teeth and spread the frame apart to permit the spool to revolve in winding up the wire, the retrograde movement being prevented by the squared face of the ratchet-teeth coming in contact with the squared face of the projections E, the gradually-reduced portions $c'$ on the trunnions acting to draw the frame together as the strain on the line-wire increases.

As there is no loose or gravity dog used in our device, the spring-frame acting itself to lock the spool, it will operate in any position of the parts and lock both ends of the spool at a time.

Having thus fully described our invention, what we claim is—

1. In a device of the character described, the combination with the spool formed with trunnions and having ratchet-teeth, of a spring-frame formed with bearings and inwardly-extending projections adjacent thereto adapted to coöperate with the spool to form a ratchet-and-pawl engagement, and the gradually reduced or tapered portions at the junction of the trunnions with the spool for the purpose described.

2. In a device of the character described, a U-shaped spring-frame formed of a single piece of sheet metal with bearings in its outer ends and having an inwardly-bent portion at its base, a spool formed with trunnions journaled in said bearings, ratchet-teeth formed on the opposite ends of said spool and inwardly-extending lugs or projections integrally formed with the frame adjacent to the spool and adapted to coöperate therewith to form a ratchet-and-pawl engagement.

3. In a wire-tightener, the combination of the spool formed with trunnions having gradually-reduced portions at or near their junction with the spool and having ratchet-teeth formed on the opposite ends of the spool, of the U-shaped spring-frame formed with the inwardly-bent portion at its base and with bearings in its free ends to receive the trunnions and the lugs or projections integrally formed with the frame at its opposite ends and adapted to coöperate with the ratchet-teeth of the spool to form a locking-pawl.

4. In a wire-tightener, the combination with the spool having flanges integrally formed with trunnions having tapering portions and ratchet-teeth on the opposite sides of the flanges of the spool, of the U-shaped spring-frame formed with bearings in the ends of the frame to receive the trunnions and inwardly-extending lugs or projections on the opposite sides of the frame adjacent to the spool and adapted to coöperate with the ratchet-teeth on the flanges of the spool to form locking-pawls.

5. In a device of the character described the combination with the frame formed with ratchet-teeth and having an apertured base, of a spool journaled in bearings in the frame and composed of the reduced central portion having a transverse aperture and the end flanges formed with ratchet-teeth, of the trunnions integrally formed with the flanges of the spool and provided with the gradually-reduced portions at or near their junction with the flanges of the spool for the purpose described.

6. In a device of the character described the combination with the spool having flanges formed with ratchet-teeth and provided with a transverse aperture, of a U-shaped spring-frame formed with bearings in which said spool is journaled and an opening in its base in alinement with said aperture, lugs or projections on the frame adapted to coöperate with the spool to form a ratchet-and-pawl engagement, the inwardly-bent portions at the base of the frame and apertures in the side walls at or near their junction with the base for the purpose described.

7. In a device of the character described, the combination of a U-shaped frame formed with bearings at its opposite ends, of a spool formed with inwardly-tapering trunnions journaled in said bearings, ratchet-teeth formed on the opposite ends of the spool and inwardly-extending lugs or projections on the frame having a ratchet-and-pawl engagement with the spool.

8. In a device of the character described, the combination of a U-shaped spring-frame formed with apertured ends forming bearings and provided in its closed end with an aperture, a winding-spool having a transverse aperture in alinement with said aperture and trunnions formed integral with said spool journaled in the bearing-apertures in the ends of the frame, one of said trunnions projecting beyond its bearing to form a wrench-hold, like ratchet-teeth formed on the flanges of the spool and lugs or projections struck up from the frame adjacent to said teeth and the gradually-reduced portions on the trunnions coöperating with the frame to draw the lugs or projections into positive engagement with the ratchet-teeth as the strain upon the line-wire increases.

In testimony whereof we affix our signatures in presence of two witnesses.

CHARLES A. WILLMARTH.
JOHN S. BARNES.

Witnesses:
OTTO F. BARTHEL,
HARRY J. FERRELL.